UNITED STATES PATENT OFFICE 2,587,845

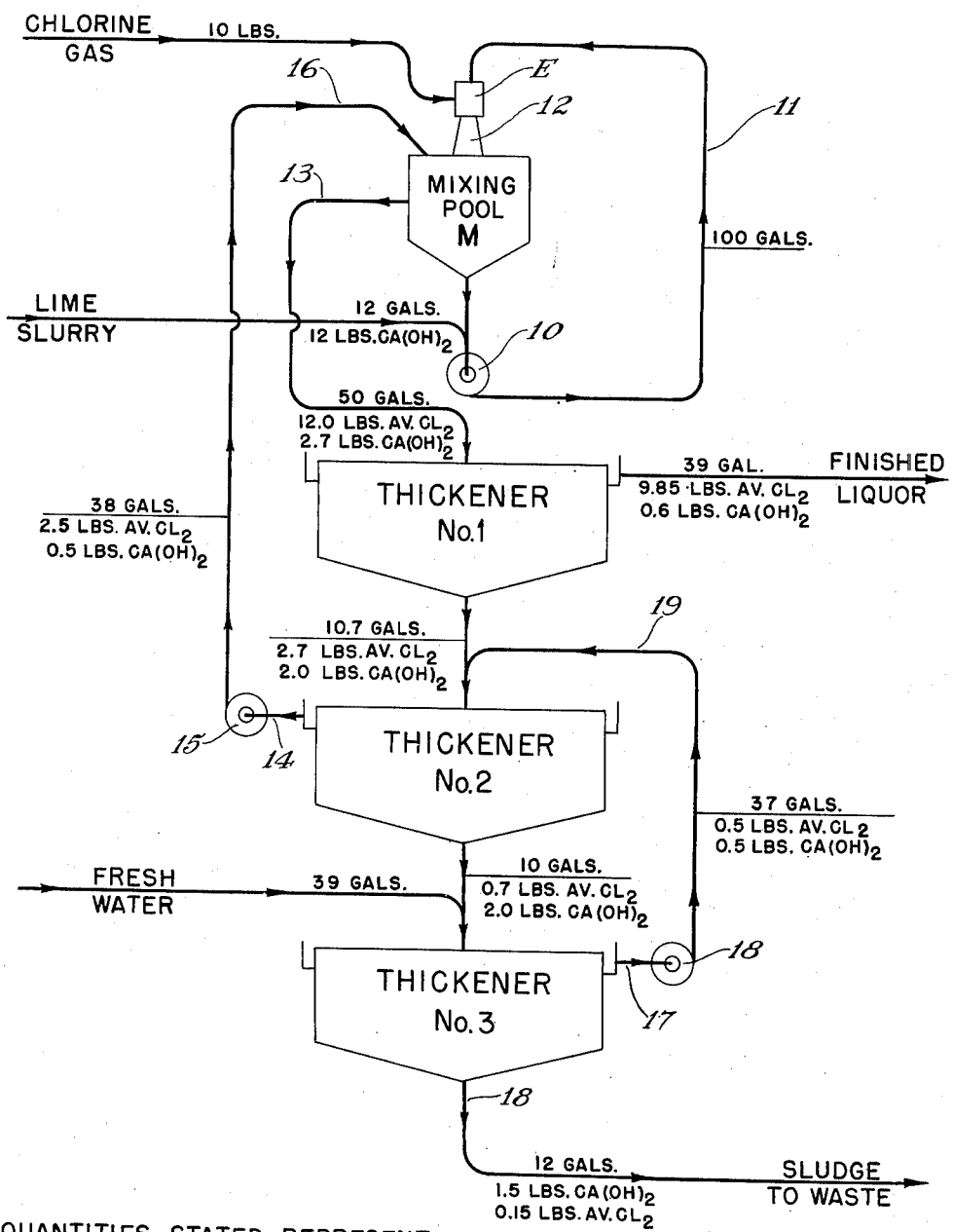

MANUFACTURE OF CALCIUM HYPOCHLORITE BLEACH LIQUOR

Harold H. Heller, Appleton, Wis., and Robert G. Shirriff, Sylacauga, Ala., assignors to Paper Patents Company, Neenah, Wis., a corporation of Wisconsin Application October 8, 1949, Serial No. 120,346

7 Claims. (Cl. 23—86)

This invention relates to the manufacture of calcium hypochlorite bleach liquor prepared by reacting calcium hydroxide $(Ca(OH_2))$ with chlorine gas, $Cl_2$. It is of particular value when applied to the production of such bleach liquor by a continuous process.

The object of the invention is to provide a method or process which can be practiced continuously, economically, and efficiently, and by means of equipment which can be readily purchased or constructed.

In practicing the invention, there are utilized certain principles which it is believed have not hitherto been recognized or utilized in the production of calcium hypochlorite bleach liquor. For example, it is a fact that when an ample quantity of calcium hydroxide is introduced into water to form a milk of lime suspension, the liquor will contain only about 1.8 grams per liter of calcium hydroxide in solution, no matter how great is the excess of lime in suspension. However, it has not generally been recognized that the dissolution of the calcium hydroxide, to the extent of 1.8 grams per liter of solution, is extremely rapid, in fact practically instantaneous if the particle sizes of the calcium hydroxide are sufficiently small, which is normally the case, and if the mixing operation be carried out efficiently and with sufficient rapidity.

Also, we believe it has not been generally recognized heretofore that the reaction between chlorine gas and the calcium hydroxide in aqueous solution also proceeds at great speed provided that the mixing of the chlorine with the calcium hydroxide solution is sufficiently rapid and intimate.

General method

In practicing the invention, we effect an intimate and rapid mixing of chlorine gas and an aqueous slurry of lime. This aqueous slurry or liquor before such mixing contains at all times, in solution, a certain amount, but less than the ultimate desired amount, of calcium hypochlorite, resulting from a similar prior mixing operation, and it also contains substantially the maximum amount of calcium hydroxide capable of being dissolved in the liquor, which amount is continuously refortified by the calcium hydroxide suspended in the liquor.

The mixing is preferably effected as a part of a continuous operation, and the pool of mixture is continuously replenished by the introduction of water, lime and chlorine. Finished bleach liquor of the desired strength is continuously withdrawn from the system.

The amount of chlorine which is introduced into the system is only slightly in excess of that which leaves the system as available chlorine in the form of finished calcium hypochlorite bleach liquor so that there is practically no loss of chlorine. The amount of lime which is fed to the system is preferably in excess of the amount represented by the stoichiometrical equivalent of the chlorine fed to the system. A small part of this excess of lime is carried off in the finished bleach liquor, which will always contain an amount of calcium hydroxide soluble therein, i. e. 1.8 grams per liter, regardless of the fact that the liquor also contains calcium hypochlorite also in solution. The remainder of the excess or un-utilized lime which is introduced into the system, may be discharged in the form of a sludge. The amount of water fed into the system exceeds the amount which leaves the system as a part of the finished bleach liquor by the amount of water which is contained in the sludge, and it is discarded as of no further value.

Mixing of the chlorine with the slurry or suspension is preferably effected either in a mixing pool or tank, or at the inlet of the mixing tank, and preferably with a portion of the contents of the mixing tank which is recirculated or recycled through the mixing zone. According to the practice which we have successfully followed in using our invention, the mixing may be advantageously effected in an eductor which discharges into the pool. In the eductor we employ a conventional Venturi type device in which the liquid is introduced in the form of a central internal jet so that the gas entrained by the jet of liquid will be instantaneously mixed with the particles of liquid spray formed by the action of the jet. In this way, there is effected an extremely rapid and intimate mixing of the gas and the liquid.

It appears that the amount of recycled liquid which is returned to the pool is desirably in excess of the amount, and preferably, a plurality of times the amount, of the finished bleach liquid discharged from the system. Also, it appears to be of some advantage to feed the lime slurry into the system at some point in the recycling line rather than into the main body of the pool. In this way, the chlorine gas when introduced into the system is mixed with liquor containing more lime in suspension and less calcium hypochlorite in solution than if the lime slurry were introduced into the main body in the mixing tank.

On account of the fact that the mixing tank or receptacle is required to handle a relatively large flow of liquid, and the mixture must necessarily contain lime and often other materials in suspension, it is necessary to separate the finished liquor from such suspended materials. This may be conveniently done in a settling tank, thickener, or other equivalent hydroseparating piece of equipment, of sufficient size and capacity so that the overflow of finished bleach liquor is relatively clear and free from suspended materials.

Since the underflow or sludge settling to the bottom of the thickener necessarily contains a certain amount of valuable finished bleach liquor adhering to the particles of sludge, it is also advantageous to recover as much as feasible of the liquid phase chemical. This may be done by a filtration step or the equivalent. We find it convenient to wash the sludge by diluting it with water or other aqueous liquor. The diluted sludge may then be filtered or subjected to a further settling in another thickener or hydroseparator. The clear weak liquor is fed into the mixing tank thus salvaging its chemical content.

Owing to the fact that the requirements of the system are such that it is not feasible to use an unlimited amount of water for diluting the sludge and salvaging the valuable bleach liquor adhering thereto, the sludge resulting from said first salvaging operation will still contain a small amount of valuable chemical. Therefore, if it is found to be economically desirable to recover this remaining amount of chemical, the sludge resulting from the first salvaging operation may be again diluted, and when this diluted sludge is settled out in another thickener or hydroseparator, the clear liquor of the overflow may be used to dilute the sludge before it enters the first salvaging stage.

It will be understood that ordinarily the number of salvaging steps found to be economically desirable depends upon various factors and conditions. Although under certain conditions a single salvaging stage is sufficient, under other conditions an additional one or more salvaging stages may be desirable in order to effect maximum economy in the consumption of the chlorine. We have found it advantageous to use two salvaging stages. It will be understood that clear, fresh water will be used to dilute the sludge entering the final settling tank or thickener.

The same considerations, i. e. practical factors, also govern the amount of excess of lime which is fed to the system. The type of lime used and the presence of other ingredients as impurities would also have some effect upon the amount of sludge which is discharged from the final settling tank as waste material.

*Specific example*

The drawing accompanying this application is a diagram or flow sheet illustrating one method of utilizing the invention as it has been practiced on a pilot plant scale in the manufacture of bleach liquor for use in the treatment of papermaking pulp.

In the drawing, M represents a tank which functions primarily as a mixing tank, as it is not usually found expedient or feasible to rely upon the mixing tank to perform the full duty of a settling tank. The overflow from the mixing tank, in the present instance a continuous flow of 50 gallons per minute and containing about 12 lbs. of available $Cl_2$, is conducted into a thickener represented by the numeral 1 on the flow sheet. The underflow from the mixing tank M is combined with a continuous flow of a fresh lime slurry fed at the rate of 12 gallons of water and containing 12 pounds of calcium hydroxide per minute. The underflow and the lime slurry are further mixed by the pump 10 which serves also to recycle the mixture through line 11 at the rate of about 100 gallons per minute. The recycled slurry in pipe 11 is conducted into the jet of the eductor E, where it meets a continuous flow of 10 pounds of chlorine gas per minute. The eductor E may be of a type such as is disclosed in U. S. Patent No. 1,747,687. The atomized slurry mixed with the chlorine entering the eductor E is discharged into the mixing tank M through the duct 12 in a conventional manner.

The thickener No. 1 is of sufficient capacity to leave time for the suspended materials to settle. The clear overflow from the settling tank 1 comprises about 39 gallons of finished bleach liquid containing 9.85% of available chlorine which is the stoichiometrical equivalent of 10.3 pounds of calcium hydroxide with which it is combined to form calcium hydrochlorite, in addition to which the liquor also contains approximately 0.6 pound of calcium hydroxide as such, in solution.

The underflow from thickener No. 1 flows out at the rate of 10.7 gallons per minute containing about 2.7 pounds of available $Cl_2$ in the form of calcium hypochlorite, and 2.0 pounds of un-reacted calcium hydroxide; this sludge underflow is then diluted with about four or five times its volume of clear water or, if a subsequent salvage stage is used, with a weak aqueous liquor coming from said latter salvage stage. In the present instance, in view of the fact that a subsequent thickener or settling tank, No. 3, is used to salvage further amounts of chemicals, this weak aqueous liquor overflowing from thickener No. 3 is mixed with the sludge underflow from thickener No. 1, thus diluting it, and enters thickener No. 2. The clear weak liquor overflow 14 from thickener No. 2 is fed by pump 15 through pipe 16 into the mixing pool M. This return flow of clear weak liquor which is at the rate of about 38 gallons per minute, contains about 2.5 lbs. of available $Cl_2$.

The underflow from thickener No. 2 which is at the rate of about 10 gallons per minute, contains about 0.7 pound of available chlorine which is generally sufficient to warrant a subsequent salvaging operation. Therefore, this underflow from thickener No. 2 is combined with about 39 gallons of fresh water and is then conducted into thickener No. 3 where it is separated into a clear overflow 17 and an underflow 18 of sludge. This sludge has volume of about 12 gallons per minute and contains only about .15 pound of available $Cl_2$ and only about 1.5 pounds of unutilized calcium hydroxide or other waste solids.

The overflow 17 from the final thickener No. 3 is delivered by pump 18 through line 19 into the underflow coming from thickener No. 1, and is thus used to dilute the sludge from thickener No. 1. This overflow of weak liquor has a volume of about 37 gallons per minute, and contains about 0.5 lb. of $Cl_2$ and about 0.5 lb. of $Ca(OH)_2$.

We claim:

1. A continuous cyclic process for producing an aqueous solution of calcium hypochlorite suitable for use in bleaching woodpulp for paper making, which includes continuously (a) feeding a supply of chlorine into a cyclic reaction circuit which includes a pool and a stream flowing from and back into said pool and containing an aqueous suspension of lime, (b) continuously withdrawing from the pool a part of its contents, (c) separating the withdrawn part into a clear bleaching liquor and a sludge containing most of the undissolved lime included in said withdrawn part, (d) separating and recovering most of the liquid phase of said sludge from the solid phase of the sludge, and (e) returning said recovered liquid phase into the reaction circuit.

2. A continuous cyclic process for producing an aqueous solution of calcium hypochlorite suitable for use in bleaching woodpulp for paper making, which includes continuously (a) feeding a supply of chlorine into a cyclic reaction circuit which includes a pool and a stream flowing from and back into said pool and containing an aqueous suspension of lime, (b) continuously withdrawing from the pool a part of its contents, (c) separating the withdrawn part into a clear bleaching liquor and a sludge containing most of the undissolved lime included in said withdrawn part, (d) diluting the sludge with an aqueous liquid, (e) separating the diluted sludge into a clear make-up liquor and a sludge, (f) feeding the make-up liquor into the reaction circuit and (g) feeding an aqueous suspension of lime into said reaction circuit and thereby maintaining an excess of suspended lime in said stream.

3. A continuous cyclic process for producing an aqueous solution of calcium hypochlorite suitable for use in bleaching pulp for papermaking, which includes continuously (a) withdrawing from a pool of an aqueous suspension of lime, a stream of said suspension, (b) mixing said stream with an aqueous slurry of lime, thereby augmenting the amount of suspended lime in said stream, (c) mixing chlorine with the said stream and thereby effecting a reaction between substantially all of said chlorine and less than all of the lime in said stream, to form a liquor containing calcium hypochlorite in aqueous solution, (d) then recycling the liquor back into said pool, (e) continuously drawing off from said pool a liquor stream having a flow rate less than that of the augmented stream, and containing lime in suspension, (f) separating said liquor stream into a major fraction of clear bleaching liquor and a sludge consisting of a mixture of undissolved material and a minor fraction of bleaching liquor, (g) recovering a substantial part of said minor fraction of liquor by separating it from most of the undissolved material in said sludge, and (h) feeding said recovered liquor into said pool.

4. A continuous cyclic process for producing an aqueous solution of calcium hypochlorite suitable for use in bleaching pulp for papermaking which includes continuously (a) withdrawing from a pool of an aqueous suspension of lime, a stream of said suspension, (b) mixing said stream with an aqueous slurry of lime, thereby augmenting the amount of suspended lime in said stream, (c) mixing chlorine gas with the said stream and thereby effecting a reaction between substantially all of said chlorine and lime in said stream to form a liquor containing calcium hypochlorite in aqueous solution, (d) then recycling the liquor back into said pool, (e) continuously drawing off from said pool a liquor stream having a flow rate less than that of the augmented stream, and containing lime in suspension, (f) separating said liquor stream into a major fraction of clear bleaching liquor and a sludge consisting of a mixture of undissolved material and a minor fraction of bleaching liquor, (g) diluting said sludge with an aqueous liquid, (h) separating most of the liquid phase of said diluted sludge from the solid phase of the sludge, and (i) feeding said separated liquor phase into the pool.

5. A continuous cyclic process for producing an aqueous solution of calcium hypochlorite suitable for use in bleaching pulp for papermaking, which comprises continuously feeding and reacting chlorine gas and a lime suspension in an agitated reaction zone, recirculating such reacted suspension, continuously withdrawing part of said reacted suspension into a settling zone, withdrawing super-lying finished bleach liquor from said settling zone, and introducing the settled sludge into a second settling zone, returning the super-lying liquor therefrom to said reaction zone, diluting the sludge from said second settling zone with an aqueous liquid and introducing it into a third settling zone, and diluting the sludge introduced into the second settling zone with the super-lying liquor from said third settling zone.

6. A continuous cyclic process for producing an aqueous solution of calcium hypochlorite suitable for use in bleaching pulp for papermaking, which comprises continuously feeding and reacting chlorine gas and a lime suspension in an agitated reaction zone, recirculating such reacted suspension, continuously withdrawing part of said reacted suspension into a settling zone, withdrawing super-lying finished bleach liquor from said settling zone, diluting the settled sludge with an aqueous liquid and introducing it into a second settling zone, and returning the super-lying liquor therefrom to said reaction zone.

7. A continuous cyclic process for producing an aqueous solution of calcium hypochlorite suitable for use in bleaching wood pulp for papermaking, which comprises (a) continuously circulating an aqueous liquid in a cyclic reaction circuit, (b) introducing a supply of lime into said circuit and mixing said lime with said circulating aqueous liquid to form a suspension of said lime in said aqueous liquid, (c) continuously introducing a supply of chlorine into said suspension while effecting a vigorous and intimate mixing of the chlorine with said suspension, (d) continuously withdrawing from said circuit a part of said circulating aqueous liquid, (e) separating the withdrawn part into a bleaching liquor and a sludge containing the solids which were suspended in said withdrawn part, (f) diluting said separated sludge with a supply of aqueous liquid, (g) separating the dilution into a dilution liquor and a sludge, and (h) continuously feeding dilution liquor into the reaction circuit.

HAROLD H. HELLER.
ROBERT G. SHIRRIFF.

REFERENCES CITED

The following references are of record in the file of this patent:

UNITED STATES PATENTS

| Number | Name | Date |
|---|---|---|
| 1,236,978 | Piston et al. | Aug. 14, 1917 |
| 1,403,993 | Wallace et al. | Jan. 17, 1922 |
| 1,481,106 | MacMahon | Jan. 15, 1924 |
| 1,884,200 | Philipp | Oct. 25, 1932 |